July 5, 1938.    G. E. SWARTZ    2,122,898
WORK HOLDER
Filed Dec. 9, 1936

INVENTOR.
Guy E. Swartz
BY
C. F. Heinkel
ATTORNEY.

Patented July 5, 1938

2,122,898

UNITED STATES PATENT OFFICE 2,122,898

WORK HOLDER

Guy E. Swartz, Detroit, Mich.

Application December 9, 1936, Serial No. 115,029

3 Claims. (Cl. 90—60)

The present invention relates to means and method for moving an element with particular reference to moving the element for work clamping and the like.

Objects of the present invention are:—

To provide a device and method wherein clamping is effected by means of a weight on a lever.

To make the weight adjustable on the lever for regulating the effect of the clamping by the weight.

To provide a clamping device of simple structure, easy and convenient of operation, saves considerable strength of an operator, always clamps with the same effectiveness of the clamping power and locks the clamping against reversing or releasing until manually released.

In the prior art, in clamping devices, operated by a lever, it is necessary that the operator move the lever for clamping and again operate the same for unclamping or releasing of the clamping. The operator must apply sufficient effort or power onto the lever to properly effect clamping. This entails uncertainty of the tightness or intensity of the clamping and is also quite tiresome for the operator physically as well as mentally.

In the present invention, a weight is used to effect the clamping and, the weight being and remaining the same distance from the axis of fulcrum of the lever, always clamps successively with the same tightness or intensity. The operator need not make special effort, physically or mentally, to see that the clamping is correct and proper since the weight remains the same, except when adjusted for different clamping intensity and will always clamp with the same force or intensity in successive clamping operations.

In the prior art, an operator had to put the full clamping force onto the operating handle. In the present invention, an operator only needs to release the weight from its position of temporal rest, such as a dead center or a stop means. The weight will then move downwardly and accelerates in movement until the member operated thereby strikes an obstruction whereupon movement of the weight stops and the obstruction is contacted with a force or pressure attained by the weight due to its downward movement. There is no need for the operator to put any pressure on the operating lever unless he desires to do so for certain reasons. The weight does the operating of the movable member in the present invention whereas the operator has to do that in the prior art.

In the present invention, as in the prior art, the operator must move the operating lever for release of the clamping, however he needs to exert no pressure of force for clamping. This entails that the operator needs to expend only about one half of the energy and saves the other half and therefore can produce more work in a given time than in the prior art.

Further advantages will be pointed out during the description of the device shown in the accompanying drawing, or will suggest themselves or become obvious or apparent upon an inspection of this specification and the drawing wherein changes in and relations of elements also become obvious or apparent or will suggest themselves.

In the accompanying drawing, referred to above:—

Similar reference characters refer to similar parts throughout the views.

Figure 1:
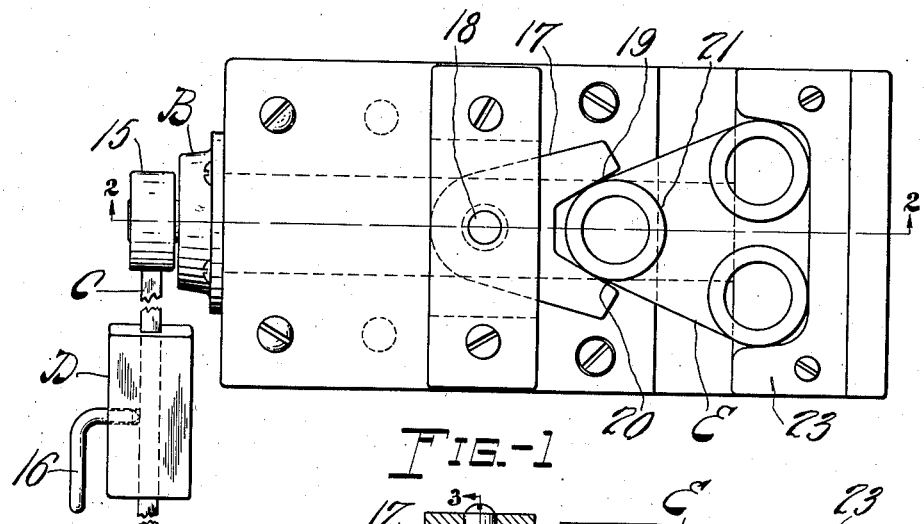
Fig. 1 is a plan view of a work clamping device, embodying the present invention and showing the general arrangements of the elements and compensating work engaging members.
Figure 2:
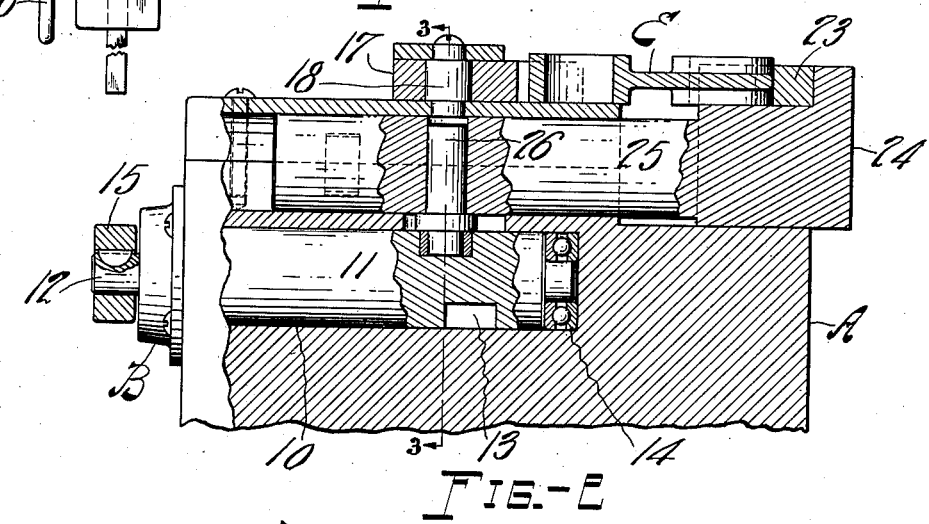
Fig. 2 is a vertical section taken on the line 2—2 indicated in Fig. 1 to show relations of elements in and on the base, only the upper portion of the device being shown here.

Description of the device shown in the accompanying drawing:—

The bed or base A, preferably made of a casing, may have the bottom part thereof made to suit a machine bed or other device that is to support the clamping device.

The stub or short shaft 10 is journaled in the base as shown, has the cylindrical part 11 fitting to the base, the end 12 projecting outside of the base for purposes appearing presently, and also has the groove 13 in the peripheral surface of the part 11.

The groove 13 is spiral and the lead of the spiral is determined by the direction in which the below described lever is to operate. The antifriction bearing 14 is shown as being introduced between the inner end of the part 11 and the bottom of the bore in the base for the part 11 to take up end thrust of the part 11 and reduce friction there. When the lead of the spiral of the groove is opposite that shown, the bearing 14 will be mounted on the opposite end of the stub 10.

The locking mechanism B is mounted on the stub 10 just outside of the base and is operated by rotative movement of the stub 10 to prevent the stub from reversing and releasing of the clamping unless the locking is released selectively by a reverse rotative movement of the lever below described. Specific structure of the locking means B is not shown in the drawing nor described herein because such specific structure forms no part of the present invention and different types and kinds of locking means can be used with the present invention with equally good effects.

Figure 3:
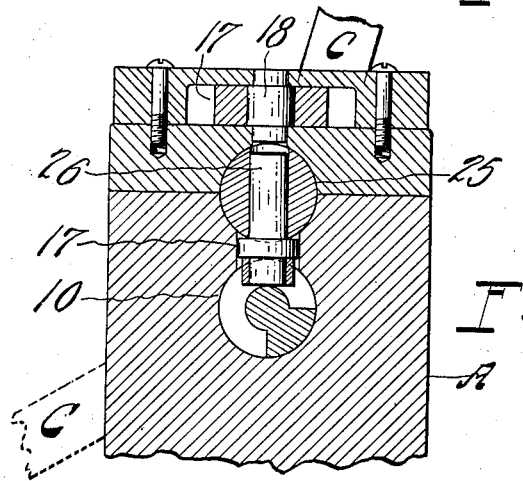
Fig. 3 is a vertical section of the upper portion of the device the section being taken on the line 3—3 indicated in Fig. 2 and shows transverse relations of elements and also shows, by full lines, the operating lever in work releasing position and, by dotted lines, in work clamping position.

The lever C has the boss 15 on one end thereof and secured to the projecting end 12 outwardly of the locking means B. The weight D is slidable along the lever C and has the set screw 16 threaded thereinto and engaging the lever for allowing the weight to be adjusted along the lever so that the weight may be set or secured different distances radially of the axis of the stub 10 so that the weight can be set to operate through different radii and thereby exert different amounts of clamping power on the below described clamping member. The lever C is shown in Fig. 3 as being moved a little beyond its dead center position so that self reversing of the lever is prevented when the same is in that position. A slight movement of the lever C moves the weight out of its dead center position whereupon the weight will move the lever rotatively by its own weight and thereby moves the clamping member. Fig. 3 shows the lever and weight moved to clamping position; this showing is in dotted lines to clearly distinguish from their neutral or upper positions.

The clamping member 17 is shown as being pivotally mounted on the pivot pin 18 fixed in the base A. The ends 19 and 20 of the member 17 are beveled to engage with the round boss 21 of the work piece E and thereby compensatingly act on the work piece when a clamping pressure is brought thereon.

The clamping member 23 is stationary on the axially movable member 24 and may be made renewable for different kinds of work as is also the member 17.

The member 24 has the shank portion 25 axially slidable in the base and the head portion upon which the previously mentioned clamping member 23 is mounted.

For structural reasons, the axes of the shank 25 and the stub 10 are here shown as being parallel; it is obvious, however, that an angular relation between these axes may be used.

The stud 26 has one end thereof fixed in the shank 25 and the other end projects into the groove 13. The collar 27 on the stud 26 acts as a spacer between the stub 10 and the shank 25 and prevents rotation of the clamping member 23 and the axially movable member 24 mounted thereon.

As to operation of the device shown and described:—

Starting with the lever and weight in the position shown in full lines in Fig. 3:—

A forward movement of the weight D and the upper end of the lever C releases the weight from its dead center condition and, due to gravity, causes the weight to move downwardly. This free movement of the weight increases the force of the clamping by the weight due to acceleration under the laws of falling bodies until the clamping member 23 contacts the work piece and suddenly stops moving of the weight. This sudden stopping of the weight movement together with the force then in the weight clamps the work piece tightly and stops rotative movement of the stub 10 and thereby throws the locking mechanism into locking condition to prevent the stub from reversing and thereby prevent the clamping member 23 from releasing the clamping. The clamping is effected by the rotation of the stub 10 and consequent axial movement of the clamping member 23 through the stud 26 engaging the spiral groove 13 and thereby moving the member 24 axially for work clamping.

A reverse movement of the lever and weight, operated manually, releases the locking and the clamping. In the device shown and described, the movement of the weight effects the clamping and the clamping is released manually so that an operator is relieved from the former necessity of exerting clamping effort and the device clamps successive work pieces with the same pressure and this pressure can be changed by adjusting the weight along the lever C.

The device shown and described is simple of structure, easy and convenient of operation and saves considerable time in operation and also saves considerable effort of an operator and that enables him to produce more work in a given time than heretofore and do so with less fatigue. The operator needs not expend any energy for work clamping as he did or does in the prior art and needs only to unclamp work as in the prior art; thusly saving substantially one half of his energy for each clamping operation. This saving is effected by letting the weight do the clamping.

It is, of course, obvious that a spring or other resilient means can be used for the specifically defined weight without departing from the present invention. The term weight, as used herein also includes such other mechanisms and is used in this specification and some of the claims as being easily understood and including equivalent means and mechanisms since applicant is well aware that such other means and mechanisms can be used.

Applicant is also aware that changes and modifications may and can be made in the structures and relations of the elements shown and described within the scope and spirit and intent of the present invention and the appended claims.

Having described my invention, I claim:—

1. In a work clamping device, a reciprocatively movable clamping member, a rotatable stub having a spiral groove therein, a stud fixed to said member and engaging with said groove, a lever on said stub for moving the same rotatively, and a weight on said lever for moving said stub rotatively in one direction.

2. A base, a clamping member movable relative to said base, a stub rotatable in said base and having a spiral groove in the peripheral surface thereof, a stud secured to said member and engaging in said groove, a lever on said stub for moving said member, and a weight on said lever for moving said member for clamping thereby.

3. A base, a clamping member reciprocatively movable for clamping and releasing, a stub rotatable in said base and having a spiral groove in the peripheral surface thereof, a stud secured to said member and extending into said groove, a lever on said stub for moving said member rotatively, a weight on said lever to move said member for clamping thereby, and a locking mechanism on said stub to prevent self-releasing of the clamping.

GUY E. SWARTZ.